(12) United States Patent
Salama (10) Patent No.: US 6,863,279 B2
(45) Date of Patent: Mar. 8, 2005

(54) REDUNDANT SEAL DESIGN FOR COMPOSITE RISERS WITH METAL LINERS

(75) Inventor: Mamdouh M. Salama, Ponca City, OK (US)

(73) Assignee: Conoco Investments Norge AD, Stavanger (NO)

( * ) Notice: Subject to any disclaimer, the term of this patent is extended or adjusted under 35 U.S.C. 154(b) by 0 days.

(21) Appl. No.: 10/006,324

(22) Filed: Dec. 5, 2001

(65) Prior Publication Data

US 2003/0107186 A1 Jun. 12, 2003

(51) Int. Cl.$^7$ ................................................ F16L 21/02
(52) U.S. Cl. ....................... 277/616; 277/652; 285/259; 166/242.2
(58) Field of Search ................................. 277/602, 616, 277/626, 627, 652; 285/55, 239, 259; 166/367, 242.2

(56) References Cited

U.S. PATENT DOCUMENTS

| | | | |
|---|---|---|---|
| 2,139,745 A | 12/1938 | Goodall ........................ 285/80 |
| 2,661,225 A | 12/1953 | Lyon et al. ................... 285/84 |
| 3,529,853 A | 9/1970 | Triest et al. ................. 285/149 |
| 3,768,842 A | 10/1973 | Ahlstone ...................... 285/55 |
| 3,989,280 A * | 11/1976 | Schwarz ...................... 285/55 |
| 4,290,836 A | 9/1981 | McPherson et al. ........ 156/171 |
| 4,549,919 A * | 10/1985 | Auberon et al. ............ 156/172 |
| 4,569,541 A * | 2/1986 | Eisenzimmer ........... 285/222.1 |
| 4,589,801 A | 5/1986 | Salama ....................... 405/224 |
| 4,634,314 A | 1/1987 | Pierce ........................ 405/195 |
| 4,728,224 A | 3/1988 | Salama et al. .............. 405/195 |
| 4,745,977 A | 5/1988 | Love et al. ................. 166/369 |
| 4,875,717 A | 10/1989 | Policelli ..................... 285/149 |
| 5,105,854 A | 4/1992 | Cole et al. .................. 138/109 |
| 5,233,737 A | 8/1993 | Policelli ..................... 285/390 |
| 5,332,049 A * | 7/1994 | Tew ............................ 175/320 |
| 5,378,023 A * | 1/1995 | Olbrich ........................ 285/24 |
| 5,398,975 A | 3/1995 | Simmons ..................... 285/93 |
| 5,443,099 A * | 8/1995 | Chaussepied et al. ....... 138/109 |
| 5,474,132 A | 12/1995 | Gallagher ................... 166/367 |
| 5,483,894 A | 1/1996 | Facciano et al. ............ 102/293 |
| 5,944,124 A | 8/1999 | Pomerleau et al. ......... 175/320 |
| 5,988,300 A | 11/1999 | Pomerleau et al. ......... 175/320 |
| 6,042,152 A | 3/2000 | Baldwin et al. .............. 285/55 |
| 6,050,612 A | 4/2000 | Wolterman ................. 285/259 |
| 6,719,058 B2 * | 4/2004 | Salama et al. .............. 166/367 |

FOREIGN PATENT DOCUMENTS

CA 2320028 3/2001

OTHER PUBLICATIONS

Pascinthe Saad, Ove Jahnsen, and Mamdouh M. Salama, "Application of Composites to Deepwater Top Tensioned Riser Systems," Jun. 23–28, 2002, pp. 1–7, Offshore Mechanics and Arctic Engineering.

(List continued on next page.)

*Primary Examiner*—Alison K. Pickard
(74) *Attorney, Agent, or Firm*—Deepwater Composites AS (57) ABSTRACT

The present invention discloses redundant sealing systems for composite risers having metal liner assemblies and methods of preventing interior fluid leakage to the outside of composite risers. An elastomeric seal is formed between an elastomeric tip provided on the end of a metal to composite interface (MCI) of the liner assembly and an elastomeric shear ply provided over the liner assembly. The elastomeric seal and a mechanical seal between the MCI and a transition ring which secures the liner to the MCI, provides a dual sealing system for the composite riser to prevent leakage of interior fluids. In the event that the integrity of the mechanical seal or the integrity of the liner is compromised, the elastomeric seal would prevent leakage of the fluid to the outside of the composite riser.

24 Claims, 3 Drawing Sheets

OTHER PUBLICATIONS

M.M. Salama, D.B. Johnson, and J.R. Long, "Composite Introduction Riser—Testing and Qualification," Aug. 1998, pp. 170–178, SPE Production and Facilities.

Mamdouh M. Salama, Turid Storhaug, Egil Martinussen, and Ole Lindefjeld, "Application and Remaining Challenges of Advanced Composites for Water Depth Sensitive Systems," Nov. 7–9, 2000, Deep Offshore Technology 2000.

Mamdouh M. Salama, Jagannathan Murali, Donald D. Baldwin, Ove Jahnsen, and Thor Meland, "Design Consideration for Composite Drilling Riser," May 3–6, 1999, pp. 1–11, Offshore Technology Conference.

Mamdouh M. Salama, et al, "Composite Risers Are Ready For Field Applications—Status of Technology, Field Demonstration and Life Cycle Economics," Oct. 17–19, 2001, pp. 1–18, Offshore Technology Conference.

International Preliminary Examination Report; PCT/US 02/38560; Dec. 16, 2003; 9 pages.

International Search Report; PCT/US 02/38662; Mar. 10, 2003; 3 pages.

PCT Written Opinion; Aug. 29, 2003; 4 pages.

* cited by examiner

REDUNDANT SEAL DESIGN FOR COMPOSITE RISERS WITH METAL LINERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to redundant sealing systems for composite risers having metal liner assemblies and methods of preventing interior fluid leakage to the outside of metal lined composite risers. More particularly, the present invention relates to an elastomeric tip provided on a metal to composite interface of the metal liner assembly and integrated with an outer elastomeric ply provided over the liner assembly which, in combination with a mechanical seal between the metal to composite interface and a transition ring of the liner assembly, provides a dual sealing system for the composite riser to prevent leakage of interior fluids.

BACKGROUND OF THE INVENTION

As exploration and production of oil and gas move into deeper water, weight, cost and reliability of water-depth sensitive systems such as risers become increasingly important. The term riser generally describes the different types of discrete pipes that extend from the seabed toward the surface of the water. These include components such as drilling risers, production risers, workover risers, catenary risers, production tubing, production risers, choke and kill lines and mud return lines. Risers can be constructed of metal and, more particularly, of steel. More recently, composite risers are being considered.

The advantages that composites offer to deepwater risers are high specific strength and stiffness, lightweightedness, corrosion resistance, high thermal insulation, high damping, and excellent fatigue performance. Capitalizing on these and other advantages for composite riser applications can result in lower system cost and higher reliability for deepwater developments. Efforts have been devoted during the recent years to assess the full potential of composite materials for deepwater riser applications. The cost savings and enabling capability of composite risers for deepwater drilling and production operations are particularly appealing.

Conventional composite risers are constructed of an outer composite material and an inner liner assembly. More particularly, in a conventional composite riser, a thin tubular metal or elastomeric liner is coaxially secured to the metal connections to form the liner assembly. For a liner assembly comprising a metal liner, an elastomeric shear ply is provided along the outer surface of the liner assembly, followed with a composite overwrap reinforcement to form the composite riser. The composite riser is heated to cure the elastomeric shear ply and the composite overwrap. An external elastomeric jacket and a layer of composite overwrap are provided over the composite riser and thermally cured for external damage and impact protection to the composite riser. The liner assembly is necessary to prevent leakage due to the inherent cracking characteristics of the composite material. The matrix in the composite will develop micro cracks at pressures lower than those at which the composite fibers will fail. The matrix micro cracking is due to the thermal stresses induced by the curing cycle and the mechanical stresses induced during the shop acceptance pressure test of the composite riser during the manufacturing process. Thus, liner assemblies are essential in ensuring fluid tightness of composite risers to prevent leakage under the conditions of matrix cracking which is inevitable.

The integrity of the composite riser, particularly at the interface between the composite overwrap and the metal connector of the liner assembly, presents a reliability issue for composite risers. Composite risers with elastomeric liners have a seal at the termination between the metal connector and elastomeric liner which is formed by the bonding of the elastomeric material of the liner and an elastomeric material which is provided on the tip of the metal termination. The reliability of the sealing system is questionable, particularly given that environmental degradation occurs to the elastomers by the production fluids.

While elastomeric liners are acceptable for production composite risers, they are ill suited for use in composite drilling or workover risers. The likely possibility of damage to elastomeric liners by the mechanical tools which are required for drilling and workover operations make the elastomeric liners undesirable for these types of operations. Thus, metal liners for composite drilling and workover risers are being considered. Metal liners also have applications as composite production risers as the metal offers better long term resistance to the production fluids than elastomers. In a conventional composite riser having a metal liner, the metal liner is welded directly to the metal connector at a section called the metal to composite interface (MCI). Alternatively, the metal liner is coaxially secured to the MCI through the use of a transition ring. The transition ring is secured at one end to the MCI and is welded at the other end to the metal liner. An advantage of using a transition ring is its ability to serve as a transition between the material of the liner and that of the MCI when different grade materials are required. For example, a liner and transition ring can be constructed of titanium, while steel can be used for the MCI. The integrity of the composite riser is dominated by the fatigue resistance of the liner welds, including the weld between the liner and the MCI or the weld between the liner and the transition ring. In addition, the seal between the transition ring and the MCI is critical to the fluid tightness of the composite riser assembly.

SUMMARY OF THE INVENTION

The present invention provides redundant sealing systems for a composite riser having a metal liner which is mechanically secured to a metal-to-composite interface (MCI) through a transition ring, and methods of preventing interior fluid leakage to the outside of metal lined composite risers.

An elastomeric seal is provided between the MCI and an elastomeric shear ply provided on the outside of the metal liner assembly of the composite riser. The elastomeric seal, in combination with a mechanical seal between the MCI and transition ring, provides a dual seal between the MCI and the metal liner to prevent leakage of interior fluids to the outside of the composite riser. In the event that the integrity of the mechanical seal or the weld between the liner and transition ring is compromised, the elastomeric seal would prevent leakage of internal fluids.

The elastomeric seal comprises an elastomeric tip which is applied in an uncured state to an inboard end of the MCI and which extends along a portion of the inner surface of the MCI proximate its interface with the transition ring. The elastomeric tip bonds with the elastomeric shear ply by heat to form the elastomeric seal, as discussed in further detail below.

The mechanical seal between the MCI and transition ring comprises conforming inner and outer grooves. A plurality of inner grooves is circumferentially provided along an inner surface of the MCI. Each inner groove is a mechanical interlock joint, such as for example, a Talon connector, which is used for steel tubular applications to provide a metal to metal seal. The conforming grooves of the transition ring comprise outer grooves which engage with the inner grooves of the MCI when the transition ring is fitted into the inboard end of the MCI. The conforming grooves engage to form the mechanical seal between the transition ring and the MCI. The elastomeric tip along the interface of the MCI and transition ring also engages with the outside of the transition ring. A metal liner is secured to the transition ring at an end opposite the MCI.

The elastomeric shear ply in an uncured state is applied over the entire length of the outer surface of the liner assembly, including over the MCI, the elastomeric tip, the transition ring and the liner. A composite overwrap is wound over the elastomeric shear ply to form a composite riser which is heated to cure the composite material and the elastomeric shear ply and elastomeric tip. The heat bonds the elastomeric tip with the elastomeric shear ply along their interface to form an elastomeric seal.

The elastomeric seal operates in conjunction with the mechanical seal formed by the conforming grooves of the transition ring and the MCI to provide a dual sealing system for the composite metal lined riser. Fluid which flows through the composite riser is prevented from leaking to the outside of the composite riser by the elastomeric seal and the mechanical seal. In the event that the integrity of the mechanical seal or the integrity of the liner is compromised, the elastomeric seal would prevent leakage of the fluid to the external environment.

DETAILED DESCRIPTION OF THE DRAWINGS

Figure 1:
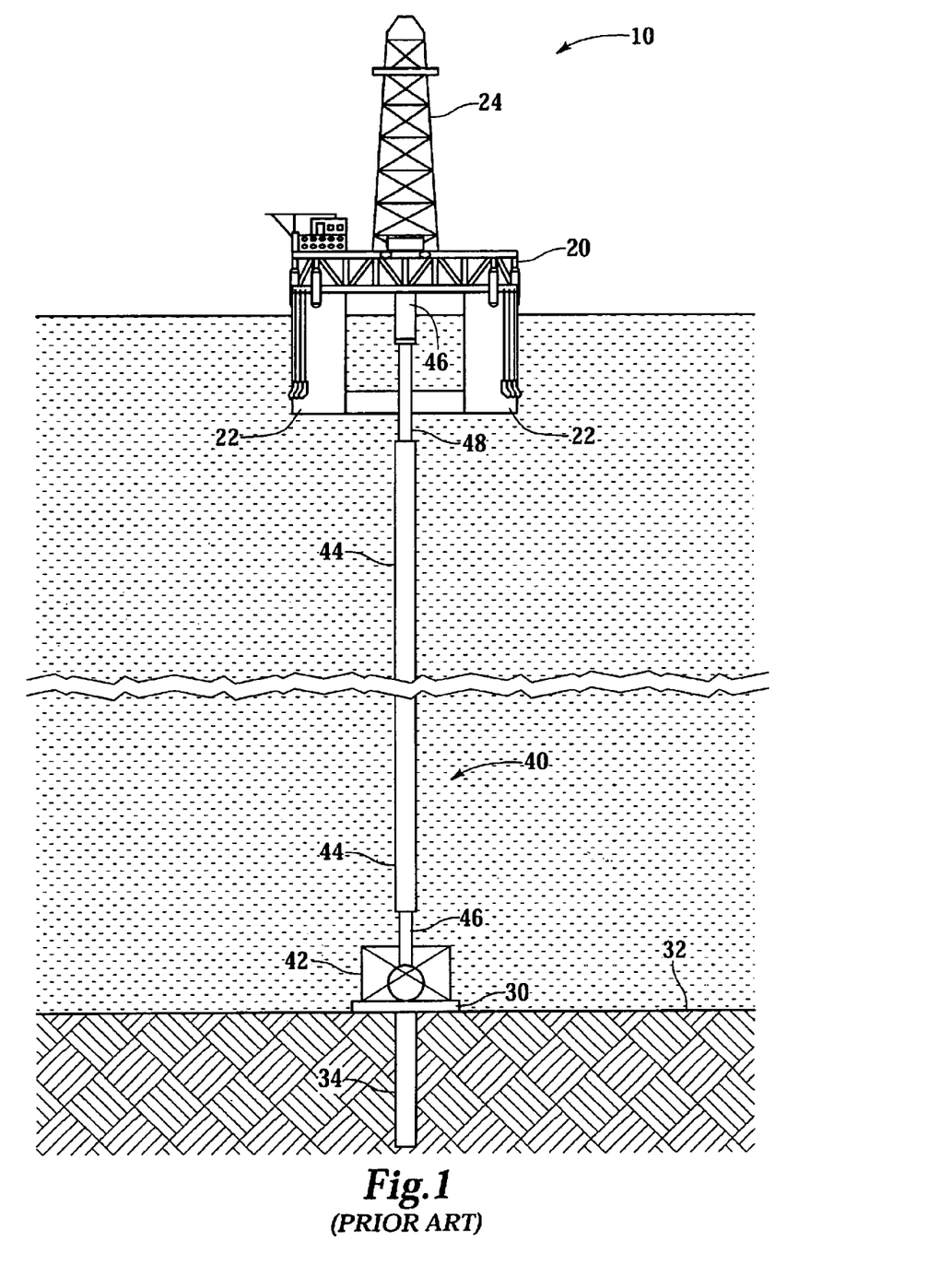
FIG. 1 is an elevational view of a schematic of an offshore drilling and production assembly.

FIG. 1 is a schematic of a conventional offshore drilling and production assembly 10 which illustrates the context of the present invention. An offshore platform 20 supports derrick 24 which is a conventional apparatus for drilling or working over a borehole and producing hydrocarbons from the borehole. Offshore platform 20 is supported by pontoons 22. A subsea platform 30 is provided on the floor of the sea 32 and a borehole 34 extends downward from the sea floor 32.

A conventional elongated riser 40 extends between borehole 34 and platform 20. Riser 40 generally comprises a tieback connector 42 proximate borehole 34 and riser sections 44 which extend between platforms 20 and 30 and are connected thereto by flex or taper joints 46 and telescoping section 48. Flex joints 46 and telescoping joint 48 accommodate the movement of platform 20 relative to subsea platform 30 and borehole 34. The elongated riser sections 44 which comprise conventional riser 40 are coaxially secured together. Each riser section 44 must accommodate the pressure of the fluid or gas within the section, the tensile load which is caused by the suspension of additional riser sections 44 below the section, the tensioner load and the bending moments imposed by the relative movement of the platform 20 with respect to the subsea platform 30.

In a composite riser, metal connectors are coaxially secured to liners to form a liner assembly which is wrapped with an elastomeric shear ply, a composite overwrap reinforcement, an external elastomeric jacket and an outer-wrap for impact and external damage protection. The composite overwrap consists of small diameter fibers (6 to 10 microns) of high strength and modulus embedded in a polymer matrix material, e.g., resins or glues. The resin materials have bonded interfaces which capture the desirable characteristics of both the fibers and the matrix. The fibers carry the main load in the composite material while the matrix maintains the fibers in the preferred orientation. The matrix also acts to transfer load into the fibers and protects the fibers from the surrounding environment. The composite material properties depend upon the two major components, the fibers and the polymeric matrix. Commonly known thermoset or thermoplastic polymeric matrices may be used. Preferred matrix materials include vinylesters and epoxies. A preferred fiber is a low cost, medium modulus (33 msi or 44 msi) polyacrylonitrile (PAN) carbon fiber. In addition, a hybrid of glass and carbon fibers incorporated in the matrix is acceptable. The fibers can also include glass fibers such as E-glass fibers.

Figure 2:
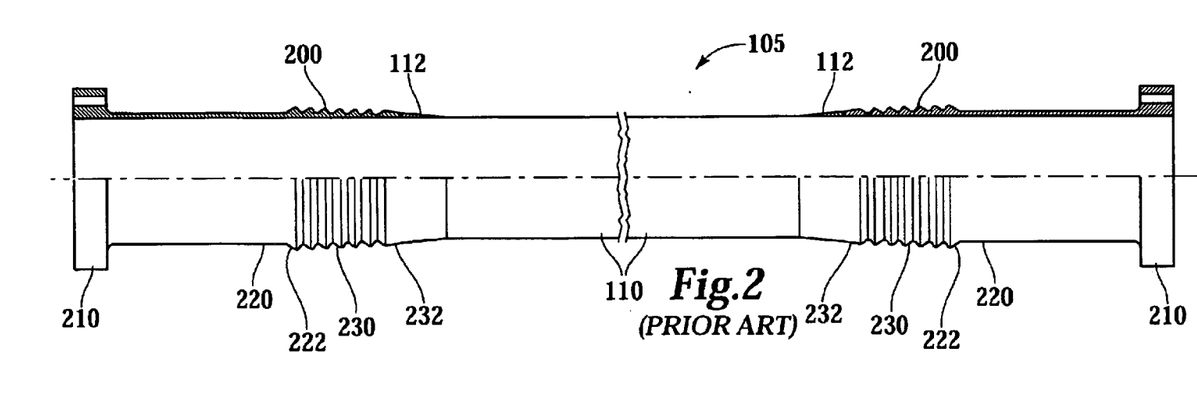
FIG. 2 is a cross-sectional view and an elevational view of a conventional composite riser metal liner assembly.
Figure 3:
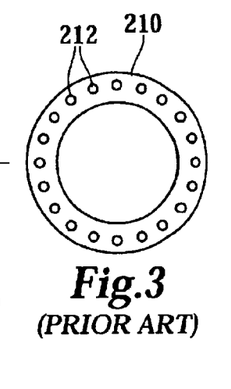
FIG. 3 is an end view of a conventional flange for composite risers.

FIG. 2 shows a conventional liner assembly 105 for a composite riser which comprises a flange extension 200 proximate each end of a tubular section of liner 110. Each flange extension 200 comprises a flange 210, a tubing section 220 and a metal to composite interface (MCI) 230. Flange 210 shown in FIGS. 2 and 3, includes a plurality of boreholes 212 along its perimeter for coaxially securing a plurality of liner sections together by aligning the boreholes of opposing flanges and securing with bolts or other means recognized in the art. Other suitable metal connector configurations commonly used in the industry are suitable for the present invention.

Tubing section 220 of flange extension 200 provides an offset between flange 210 and MCI 230. By way of example and not by way of limitation, tubing section 220 having an outer diameter of approximately 24 inches can have a length of approximately 31 inches which provides a region for maneuvering the flange assembly tools between flange 210 and MCI 230 during installation. Tubing section 220 is secured at its inboard end 222 opposite flange 210 to MCI 230. A preferred means for securing tubing section 220 and MCI 230 is by welding the ends together. Alternatively, tubing section 220 and MCI 230 can be fabricated from a continuous tubular section having inboard end 232 proximate MCI 230.

In liner assembly 105, a tubular transition ring 270 is coaxially secured at one end to inboard end 232 of MCI 230. The other end of transition ring 270 is secured to liner section 110. Transition ring 270 can be coaxially secured by welding its ends to inboard end 232 of MCI 230 and liner section 110 or, alternatively, can be fabricated from a continuous tubular joint with MCI 230 or with liner section 110.

Figure 4:
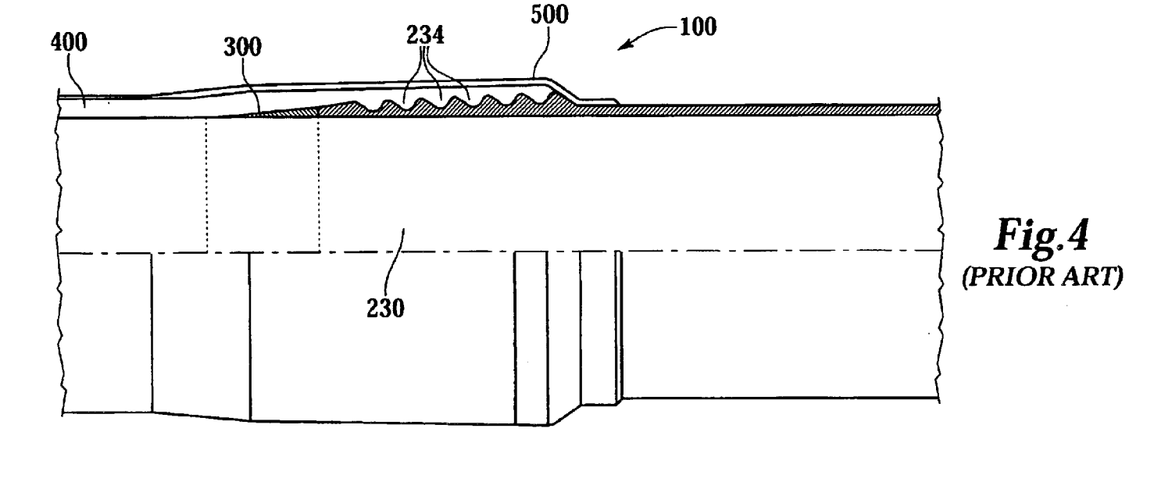
FIG. 4 is a cross-sectional view and an elevational view of a conventional metal to composite interface (MCI) for a composite riser.

FIG. 4 shows a conventional composite riser 100. MCI 230 comprises a plurality of outer grooves 234 which are illustrated in a trap lock configuration. While four trap lock grooves 234 are shown, the number can vary as appropriate for the particular use. In addition, configurations other than a trap lock configuration are acceptable. Each groove 234 is a mechanical interlock joint which is fabricated into the outer surface of MCI 230. An elastomeric shear ply 300 in an uncured state is applied to the outer surface of the liner assembly 105 of FIG. 2 to provide an interface between the liner assembly 105 and a structural composite overwrap 400. Elastomeric shear ply 300 can have any suitable thickness, and the thickness can vary at particular regions of the liner assembly 105 to achieve desired characteristics. By way of example and not by way of limitation, the thickness of the elastomeric shear ply 300 can be approximately 0.09 inches over the entire length of the liner assembly, while the shear ply thickness can be reduced to approximately 0.01 inches over outer grooves 234 of MCI 230. A thinner elastomeric shear ply interface over outer grooves 234 allows the surface of the grooves 234 and the shear ply 300 to move relative to the structural composite overwrap 400.

Structural composite overwrap 400 is a composite tube comprising carbon, glass or other reinforcing fibers and an epoxy matrix, as previously discussed, which is fabricated over liner assembly 105 using a filament winding process. Generally, the composite overwrap 400 is wound over the elastomeric shear ply 300 which has been applied to liner assembly 105. The composite overwrap includes helical layers that extend axially along between the MCIs 230 of the composite riser and hoop layers that are applied circumferentially around the elastomeric shear ply 300. Both the helical layers and the elastomeric shear ply 300 are compacted into outer grooves 234 of MCI 230 by a layer of the fiber and matrix hoop windings of composite overwrap 400.

The filament winding process for fabricating the composite overwrap 400 over the liner assembly 105 is generally described as follows. Composite overwrap 400 consists of alternating helical and hoop layers, including an initial consolidating hoop layer which is wound over the elastomeric shear ply 300. After winding each of the fiber and matrix helical layers, the layer is compacted into an outer groove 234 with hoop windings. A plurality of helical layers is then compacted into each of outer grooves 234. Localized reinforcing layers of fiber and matrix can be applied over MCI 230 and compacted into each of the outer grooves 234 to improve the load share between the grooves 234 and to increase the strength of MCI 230. The thickness of the individual carbon layers may be approximately 0.03 inches. A final layer of hoop windings is wound over the entire length of the liner assembly 105, including MCI 230, thereby completing the filament winding of composite overwrap 400. Other filament winding processes recognized in the art may be suitable for the present invention.

After the filament winding is complete, the wound assembly is transferred to an oven or the oven is transferred to the assembly where heat is applied to cure the thermosetting matrix of composite overwrap 400 and elastomeric shear ply 300. After the cure, external jacket 500 of an uncured elastomeric material is applied over the entire length of the resulting composite riser 100 to prevent migration of seawater into the composite wall and through its interface with the MCI. External elastomeric jacket 500 provides external damage protection and a degree of impact protection, mitigating damage from small dropped objects and mishandling of composite riser 100. A composite of E-glass or other reinforcing fibers such as carbon in a polymeric matrix 600 can be filament wound over the external elastomeric jacket 500 to compact the jacket during the cure and to provide scuff protection. The composite riser is then heated to a suitable temperature to cure elastomeric external jacket 500 and scuff protection outerwrap 600.

Figure 5:
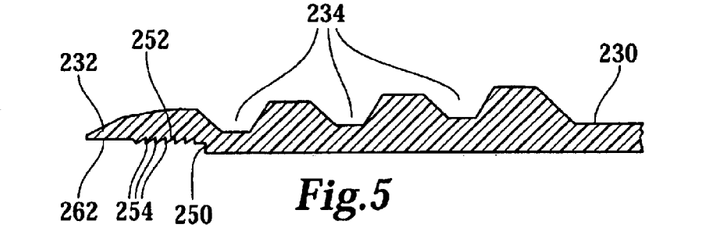
FIG. 5 is a quarter-sectional view of the MCI for a composite riser having seal surfaces circumferentially along the inner tubular surface of the MCI.

Referring to the quarter-sectional view of MCI 230 shown in FIG. 5, a first lip 250 and a second lip 260 are provided circumferentially along the inner tubular surface of MCI 230. Second lip 260 is positioned between first lip 250 and inboard end 232 of MCI 230. Second lip 260 defines elastomeric seal surface 262 which extends along the inner tubular surface of MCI 230 from second lip 260 to inboard end 232. First lip 250 defines mechanical seal surface 252 extending along the inner tubular surface of MCI 230 between first lip 250 and second lip 260. A plurality of inner grooves 254 is provided circumferentially along mechanical seal surface 252. Each groove 254 is a mechanical interlock joint which is machined, wound or otherwise fabricated in the inner tubular surface of MCI 230. While grooves 254 are illustrated in a Talon configuration, other configurations common in the art are acceptable.

Figure 6:
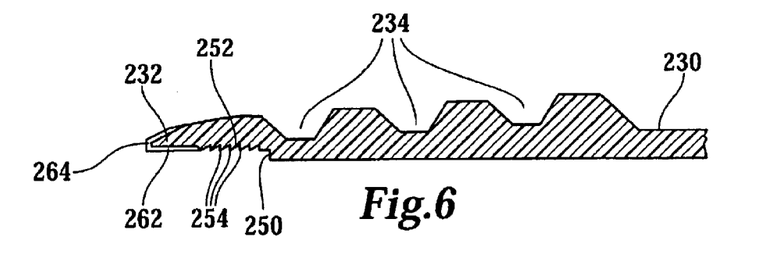
FIG. 6 is a quarter-sectional view of the MCI for a composite riser having an elastomeric tip provided along a seal surface.

Referring to FIG. 6, an elastomeric tip 264 in an uncured state is applied to inboard end 232 of MCI 230. Elastomeric tip 264 extends along the outer surface of MCI 230 around the tip of inboard end 232 and along elastomeric seal surface 262 to abut second lip 260. Elastomeric tip 264 is preferably molded to inboard end 232, but can be applied by other fabrication methods. The thickness of elastomeric tip 264 along seal surface 262 should be substantially similar to the depth of second lip 260 into inner surface of MCI 230 such that the elastomeric layer along elastomeric seal surface 262 is substantially flush with mechanical seal surface 252.

Figure 7:
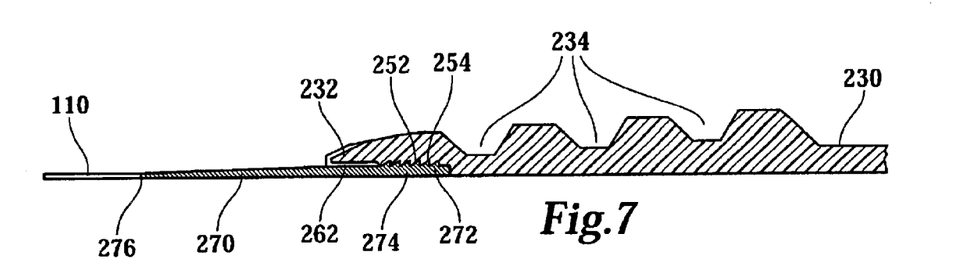
FIG. 7 is a quarter-sectional view of the MCI with elastomeric tip and a transition ring secured to the MCI.

Turning to FIG. 7, a tubular transition ring 270 having outer grooves 274 which conform to inner grooves 254 of mechanical seal surface 252 of MCI 230 is fitted into inboard end 232 of MCI 230, one end seating against first lip 250 and the other end extending outwardly from inboard end 232. Conforming outer grooves 274 of transition ring 270 and inner grooves 254 of mechanical seal surface 252 engage to form mechanical seal 272 between the inner surface of MCI 230 and the outer surface of transition ring 270. Elastomeric tip 264 engages with transition ring 270 proximate elastomeric seal surface 262. A liner section 110 is secured to transition ring 270 proximate transition ring inboard end 276. Transition ring 270 and liner section 110 can be secured by welding them together coaxially or, alternatively, by fabricating them from a continuous tubular section.

Figure 8:
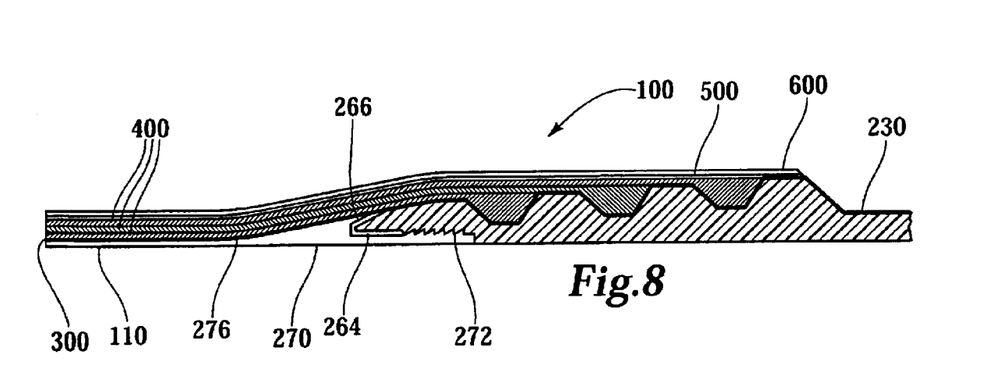
FIG. 8 is a quarter-sectional view of the composite riser.

Referring to the embodiment shown in FIG. 8 and the previous discussion with reference to FIG. 4, elastomeric shear ply 300 is applied over the entire length of the outer surfaces of liner section 110, transition ring 270, elastomeric tip 264 and MCI 230. Structural composite overwrap 400 is wound over the elastomeric shear ply 300 as previously discussed and the resulting composite riser 100 is heated to cure the composite overwrap 400, the elastomeric shear ply 300 and the elastomeric tip 264. The elastomeric shear ply 300 and elastomeric tip 264 bond together along their interface to form elastomeric seal 266.

After the composite riser 100 is cured, external jacket 500 of an uncured elastomeric material is applied over the entire length of composite riser 100, followed with a filament winding of reinforcing fibers in a polymeric matrix 600. The assembly is heated to a suitable temperature to cure elastomeric external jacket 500 and polymeric matrix 600 thereby providing protection of the composite riser from external damage and impact protection.

Elastomeric seal 266 provides a second or dual seal for composite riser 100, in addition to the mechanical seal formed between the conforming inner and outer grooves 254, 274 of MCI 230 and transition ring 270, respectively. Elastomeric seal 266 and mechanical seal 272 prevent fluids or gases within the composite riser 100 from leaking to the outside. However, in the event that the integrity of mechanical seal 272 or the liner assembly 105 is compromised, or the weld between the liner and transition ring fails, elastomeric seal 266 would prevent fluid from leaking to the outside of composite riser 100. For example, in composite risers where the weld between transition ring 270 and liner section 110 fails or mechanical seal 272 fails, fluids or gases within liner assembly 105 would migrate through the failed weld or mechanical seal 272 and under elastomeric shear ply 300. The pressure of the leaked fluid or gases would force elastomeric tip 264 against elastomeric seal surface 262 of MCI 230 which would minimize or prevent the fluids or gases from escaping around elastomeric seal 266 to the outside of the composite riser 100. Thus, the use of elastomeric seal 266 in a composite riser would increase the reliability of the sealing system and provide additional time to retrieve and repair the failed liner or mechanical seal while preventing leakage of the interior fluids to the external environment.

Additional information regarding sealing systems for composite risers is disclosed in U.S. patent application Ser. No. 10/010,191 entitled Multiple Seal Design for Composite Risers and Tubing for Offshore Applications, having as a co-inventor Mamdouh M. Salama (the inventor here) and filed on the same date as this application, the entire disclosure of which is incorporated herein by reference. Helpful background information regarding composite drilling risers is disclosed in the following articles each of which is incorporated by reference herein in its entirety: Composite Risers are Ready for Field Applications—Status of Technology, Field Demonstration and Life Cycle Economics, $13^{th}$ International Deep Offshore Technology Conference (DOT 2001), Rio de Janeiro, Brazil, Oct. 17–19, 2001: Remaining Challenges of Advanced Composites for water depth sensitive systems, presented at the $2^{nd}$ Annual Deep Offshore Technology Int. Conf. Held in New Orleans, La. on Nov. 7–9, 2000; OTC 11006: Design Consideration for Composite Drilling Riser, presented at the Offshore Technology Conference held in Houston, Tex. on May 3–6, 1999; SPE 50971: Composite Production Riser Testing and Qualification, SPE Production & Facilities, Aug. 1998 (p. 168–178).

What is claimed is:

1. A dual sealing system comprising dual seals in a composite riser having a metal liner assembly wherein said dual seals prevent leakage of internal fluid to the outside of the composite riser, the dual sealing system further comprising:
   a mechanical seal in the liner assembly between a transition ring and a metal to composite interface (MCI); and
   an elastomeric seal between an elastomeric tip provided on the MCI and an elastomeric shear ply provided on the outside of the liner assembly of the composite riser; wherein the transition ring and the elastomeric tip are different elements of the composite riser.

2. The dual sealing system of claim 1 wherein said elastomeric seal prevents leakage of internal fluids to the outside of the composite riser in the event that the integrity of said mechanical seal or the integrity of the metal liner is compromised.

3. The dual sealing system of claim 1 wherein said elastomeric tip is provided proximate an interface between the MCI and the transition ring.

4. The dual sealing system of claim 3 wherein said elastomeric seal prevents leakage of internal fluids to the outside of the composite riser in the event that the integrity of said mechanical seal or the integrity of the metal liner is compromised.

5. The dual sealing system of claim 1 wherein said elastomeric tip and the elastomeric shear ply are bonded together to form said elastomeric seal.

6. The dual sealing system of claim 1 wherein said elastomeric tip and the elastomeric shear ply are provided in an uncured state and are cured to form said elastomeric seal.

7. The dual sealing system of claim 1 wherein the transition ring is welded to a liner section in the liner assembly.

8. The dual sealing system of claim 1 wherein the transition ring comprises part of a continuous tubular liner section in the liner assembly.

9. The dual sealing system of claim 1 wherein the mechanical seal comprises conforming grooves between the transition ring and the MCI.

10. A method of preventing leakage of internal fluid to the outside of a composite riser having a metal liner assembly, comprising the steps of:
    providing dual seals; and
    allowing fluid to flow through the composite riser, wherein said fluid is prevented from leaking to the outside of the composite riser by said dual seals;
    wherein one of said dual seals comprises an elastomeric seal between an elastomeric tip provided on a metal to composite interface (MCI) of the liner assembly and an elastomeric shear ply provided on the outside of the liner assembly of the composite riser; and wherein said elastomeric tip is provided between the MCI and a transition ring of the liner assembly.

11. The method of claim 10 wherein, in the event of leakage of said fluid, said leaked fluid forces said elastomeric tip against the MCI to prevent said fluid from leaking to the outside of the composite riser.

12. The method of claim 10 wherein the other of said dual seals comprises a mechanical seal in the liner assembly between the MCI and the transition ring.

13. The method of claim 12 wherein, in the event of leakage of said fluid around said mechanical seal, said leaked fluid forces said elastomeric tip against the MCI to prevent said fluid from leaking to the outside of the composite riser.

14. The method of claim 12 wherein, in the event of leakage of said fluid from the liner, said leaked fluid forces said elastomeric tip against the MCI to prevent said fluid from leaking to the outside of the composite riser.

15. The method of claim 12 wherein said elastomeric seal prevents leakage of said fluid to the outside of the composite riser in the event that the integrity of said mechanical seal or the integrity of the liner is compromised.

16. The method of claim 12 wherein the mechanical seal comprises conforming grooves between the transition ring and the MCI.

17. The method of claim 12 wherein the transition ring comprises part of a continuous tubular liner section in the liner assembly.

18. A metal to composite interface (MCI) of a composite riser having a liner assembly for use with hydrocarbon production, comprising:
- an elastomeric tip provided along an end of the MCI for forming an elastomeric seal with an elastomeric shear ply provided on the outside of the liner assembly to prevent leakage of internal fluid to tile outside of the composite riser; and
- a mechanical seal surface on the inner surface of the MCI for forming a mechanical seal with a metal transition ring of the liner assembly to prevent leakage of internal fluid to the outside of the composite riser;
- wherein the elastomeric seal and the mechanical seal are separate and distinct seals.

19. The MCI of claim 18 wherein said elastomeric tip and the elastomeric shear ply are provided in an uncured state and are cured to form said elastomeric seal.

20. The MCI of claim 18 wherein said elastomeric tip is provided proximate an interface between the MCI and the transition ring of the liner assembly.

21. The MCI of claim 20 wherein said elastomeric tip and the elastomeric shear ply are provided in an uncured state and are cured to form said elastomeric seal.

22. The MCI of claim 18 wherein said mechanical seal surface comprises inner grooves which conform to outer grooves of the transition ring to form said mechanical seal.

23. The MCI of claim 18 wherein the transition ring is welded to a liner section in the liner assembly.

24. The MCI of claim 18 wherein the transition ring comprises part of a continuous tubular liner section in the liner assembly.

* * * * *

UNITED STATES PATENT AND TRADEMARK OFFICE
CERTIFICATE OF CORRECTION

PATENT NO. : 6,863,279 B2  
DATED : March 8, 2005  
INVENTOR(S) : Salama

It is certified that error appears in the above-identified patent and that said Letters Patent is hereby corrected as shown below:

Title page,
Item [73], Assignee, should be -- Deepwater Composites AS --
Item [74], *Attorney, Agent, or Firm*, should be -- Conley Rose, P.C. --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,863,279 B2 | Page 1 of 5 |
| APPLICATION NO. | : 10/006324 | |
| DATED | : March 8, 2005 | |
| INVENTOR(S) | : Mamdouh M. Salama | |

It is certified that error appears in the above-identified patent and that said Letters Patent is hereby corrected as shown below:

Sheet 2 of 3 - Drawings

Fig. 2, replace with the following figure: see attached

Sheet 2 of 3 - Drawings

Fig. 4, replace with the following figure: see attached

UNITED STATES PATENT AND TRADEMARK OFFICE
CERTIFICATE OF CORRECTION

| | |
|---|---|
| PATENT NO. | : 6,863,279 B2 |
| APPLICATION NO. | : 10/006324 |
| DATED | : March 8, 2005 |
| INVENTOR(S) | : Mamdouh M. Salama |

It is certified that error appears in the above-identified patent and that said Letters Patent is hereby corrected as shown below:

Sheet 3 of 3 - Drawings

Figs. 5 and 6, replace with the following figures: see attached

Fig.5

Fig.6

UNITED STATES PATENT AND TRADEMARK OFFICE
CERTIFICATE OF CORRECTION

PATENT NO. : 6,863,279 B2  Page 3 of 5
APPLICATION NO. : 10/006324
DATED : March 8, 2005
INVENTOR(S) : Mamdouh M. Salama It is certified that error appears in the above-identified patent and that said Letters Patent is hereby corrected as shown below:

Sheet 3 of 3 - Drawings

Fig. 7, replace with the following figure: see attached

Column 5

Line 60, replace "carbon" with -- composite --.

Signed and Sealed this

Twenty-fourth Day of October, 2006

JON W. DUDAS
*Director of the United States Patent and Trademark Office*